United States Patent Office 3,539,753
Patented Nov. 10, 1970

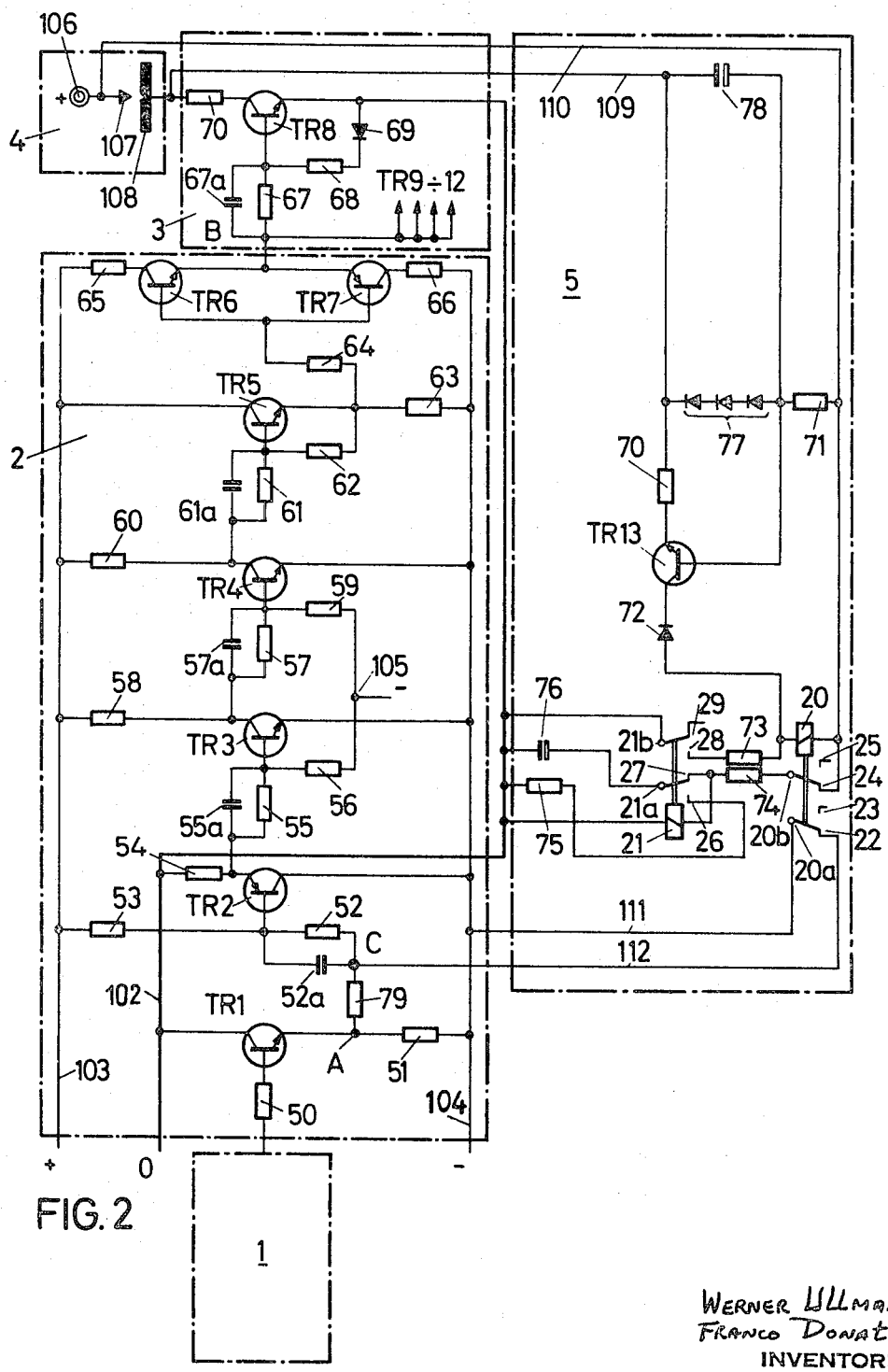

3,539,753
MONITORING APPARATUS FOR ELECTRO-EROSION PULSE GENERATOR
Werner Ullmann, Locarno-Muralto, and Franco Donati, Locarno, Switzerland, assignors to A.G. fur industrielle Elektronik AGIE, Losone-Locarno, Switzerland, a corporation of Switzerland
Filed Feb. 10, 1966, Ser. No. 526,528
Claims priority, application Switzerland, Feb. 11, 1965, 1,858/65
Int. Cl. B23p 1/08
U.S. Cl. 219—69                                          10 Claims

ABSTRACT OF THE DISCLOSURE

An improved monitoring or supervising apparatus is disclosed for electro-erosion pulse generators incorporating a pulse shaper, amplifier and output stages coupled with the work or erosion gap. The monitoring apparatus comprises a first switch and functions to detect a voltage drop at the work gap due to the formation of an arc thereof and responds to suppress the generation of work pulses from the electro-erosion pulse generator. After a predetermined time interval, a second switch of the monitoring apparatus is actuated to reset the first switch and thus reset the monitoring apparatus.

---

The present invention has reference to an improved monitoring or supervising apparatus for electro-erosion pulse generators incorporating a pulse shaper, amplifier and output stages coupled with the work or erosion gap.

In pulse generators, during electro-erosion machining short circuits occur at the work or erosion gap (between workpiece and work electrode). These short circuits are typically caused by the material eroded from the workpiece and by the so-called cracking products (carbon particles) which form during the high spark temperatures, because the dielectric liquid with which the work electrode and workpiece are flushed is not able, in some cases, to immediately carry this eroded or removed material out of the erosion gap. Hence, arcs form between the work electrode and the workpiece on account of such short circuits and, because of their thermal action for long periods of time, produce structural changes up to ten millimeters depth in the workpiece to be machined. Apart from this, if such arcs frequently appear during electro-erosion machining, then it is readily possible that the form or shape of the work electrode can no longer be exactly reproduced at the workpiece.

In order to prevent these disadvantages such as deeply penetrating structural changes and reproduction inaccuracies, there have already been devised automatic electrode feed devices which, upon the appearance of short circuits, remove the electrode from the workpiece and thereby enlarge the erosion or work gap as a function of the voltage subsisting at the work gap, so that the arc collapses. However, such feed devices unfortunately have a large time lag until they respond. Hence, in order to be able to completely prevent short circuits protective circuits have been constructed which already interrupt the supply conductors of the electro-erosion current circuit prior to response of the electrode feed devices. Undesirably, however, these protective devices also have the disadvantage that the electro-erosion current circuit will be interrupted even under conditions resembling short circuits. Due to their over-sensitivity the entire electro-erosion machining operation is slowed down so that, notwithstanding the provision of very good and reliable pulse generators, the efficiency of the entire process considerably drops.

Accordingly, it is a primary object of the present invention to provide an improved monitoring device which works reliably and accurately in accordance with practical requirements and which overcomes the aforementioned disadvantages.

A further important object of this invention is directed to an improved monitoring or supervisory apparatus of the type described which is formed of relatively simple elements so that the costs of manufacture and maintenance are held to a minimum.

Yet a further considerable object of this invention has reference to an improved monitoring apparatus for electro-erosion pulse generators which switches off the supply of current when there appears undesired voltage changes at the erosion gap.

Still a further noteworthy object of this invention is the provision of an improved monitoring device of the type described which can subsequently be installed in almost every known pulse generator for electro-erosive metalworking by virtue of its advantageous physical structure.

In order to implement these and still further objects, the present invention is characterized by the features that a switching arrangement or device, provided at the work gap and at the input side of an amplifier consisting of a number of electronic switches, exhibits a change in potential upon dropping of the voltage at the work gap beneath a predetermined value, whereby the output stage is blocked or rendered non-conductive in consequence of the mutual influencing of the electronic switches arranged in the amplifier in a predetermined manner.

Other features, objects and advantages of the invention will become apparent by reference to the following detailed description and drawings in which:

FIG. 2 depicts details of the circuitry for the arrangement depicted in FIG. 1.

Figure 1:
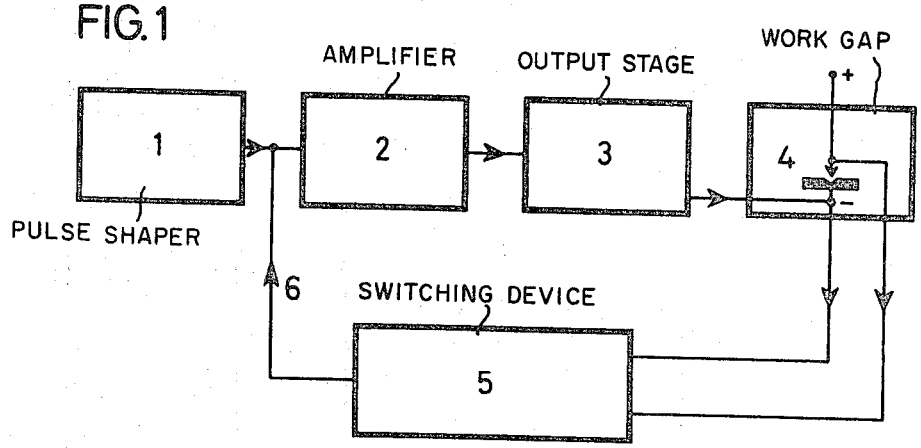
FIG. 1 is a block diagram of an electro-erosive pulse generator provided with the inventive monitoring or supervising apparatus.

Describing now the drawings, by referring to FIG. 1, it will be seen that the pulse shaper stage 1 is coupled with the amplifier stage 2 and delivers to the latter square or rectangular-shaped pulses which, depending upon the electro-erosion machining technique, can be changed in known manner as regards their amplitude, pulse interval or interpulse pause ratio and pulse-recurrence frequency. The amplifier pulses arrive at the output stage 3. At this location the circuit leading to the workpiece is interrupted or opened by suitable switch means in accordance with such pulses. These switches or switch means are arranged between the negative pole of a voltage source, which has been omitted for clarity in illustration, and the workpiece 108 (FIG. 2) at the erosion or work gap 4. The tool electrode 107 (FIG. 2) is coupled to the positive pole of this same voltage source. In accordance with the switching rhythm of the switches in the output stage 3, work pulse appear between the tool electrode 107 and the workpiece 108 at the erosion gap 4.

The voltage at the work or erosion gap 4 is supplied to the switching arrangement or device 5. The output of this switching device 5 is electrically coupled via the conductor 6 with the input of the amplifier stage 2. Now, if the voltage at the work or erosion gap 4 falls below five volts for instance, that is, if there exists a tendency for a short circuit to appear at the work gap, then the switching device 5 acts via the conductor 6 upon the amplifier stage 2 in a manner that the pulses from the pulse shaper stage 1 are suppressed. Because of this, no pulses whatsoever arrive at the output stage 3 so that the electro-erosion current circuit is opened and, therefore, there is interrupted the occurrence of arcs. After a short time, the switching device 5 frees the path for the pulses to the amplifier stage 2, so that the electro-erosion machining operation can again continue at the work or operating gap 4. Upon continuing the work cycle, should the tendency towards short circuiting at the work gap still not be overcome, then the swtiching device 5 again becomes operative in the abovedescribed manner. This can repeat a number of times and eventually be indicated to the operating personnel by an acoustical or optical alarm. However, the just-considered situation rarely occurs since normally the feed device for the work electrode which, as already previously considered, also responds to a drop of the voltage at the work gap 4, increases the size of the gap. As a result, the eroded metal particles and the cracking products can be better removed from the work gap by the flow of the dielectric liquid.

Having now had an opportunity to consider the general arrangement of pulse generator provided with the inventive monitoring or supervisory apparatus of FIG. 1, attention is now directed to the circuit diagram of FIG. 2 illustrating details of the circuitry. In this figure, the pulse shaper stage 1 has not been depicted in detail since such is well known to the art and, besides, does not form part of the subject matter of this invention. The amplifier stage 2 is composed of a series of electronic switches which in the exemplary embodiment have been designated as transistors TR1 to TR7. The electro-erosion current circuit consists of the positive pole 106 of the non-illustrated voltage source, the tool electrode 107, workpiece 108, conductor 102 and the opposite pole of this voltage source. The conductors 103 and 104 are positive and negative respectively, with regard to the potential of the conductor 102 which has been designated by O. Conductor 105 in the amplifier stage 2 is more negative in relation to the potential of the conductor 102 than the conductor 104.

Figure 3:
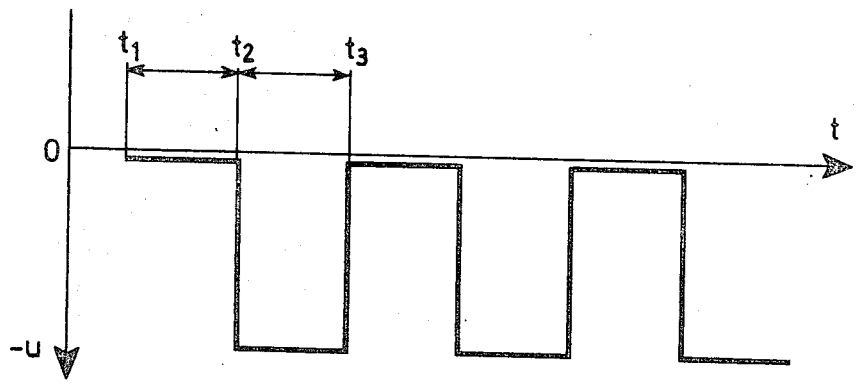
FIG. 3 is a diagram depicting the control of the work pulses.

There will now be briefly considered the mode of operation of FIG. 2: The rectangular or square-shaped pulses produced at the pulse shaper stage 1 control the transistor TR1 of the NPN variety in the manner that at junction A of its emitter circuit there appears a pulse train of the form depicted in FIG. 3. During the time $t_1$ to $t_2$, the base of the PNP type transistor TR2 is positive due to the voltage divider circuit arrangement of the resistors 79, 52, 53. The transistor TR2 of the PNP variety is blocked or non-conductive when its base is positive with respect to its emitter, so that through the resistor 55 the base of the NPN type transistor TR3 is positive with respect to its emitter. The transistor TR3 is thus in conducting state. This brings about via resistor 57 that the base of the NPN type transistor TR4 is negative with respect to its emitter so that the transistor TR4 is non-conductive or blocked. The resistors 56 and 59, which are coupled with the base of the transistor TR3 and the base of the transistor TR4, are commonly connected via the conductor 105 to a negative potential. The resistors 56, 59 serve to ensure for the proper blocking of the transistors TR3 and TR4. At its collector there appears a positive potential which is transmitted via the resistor 61 to the base of the NPN transistor TR5, whereby the latter is brought into conducting state due to the base being positive with respect to its emitter.

At this point mention will be briefly made of the function of the capacitors 52a, 55a, 57a and 61a coupled in the base circuits of the transistors TR2, TR3, TR4 and TR5. These capacitors serve as so-called acceleration capacitors and bring about rapid change-over of the transistors from the non-conducting or blocking state into the conducting state. The positive potential of the emitter-collector circuit of the transistor TR5 passes from he conductor 103 via the resistor 64 to the base of the NPN type transistor TR6 and the PNP type transistor TR7. The transistor TR6 is brought into conducting state whereas the transistor TR7 is brought into non-conductive state. Accordingly, at the output side of the amplifier stage 2 there appears through the resistor 65 the positive potential of the conductor 103. This potential or bias passes to the junction B of the output stage 3 and thus via resistor 67 arrives at the base of the NPN type transistor TR8. This transistor TR8 is thus brought into the conducting state. As a result, voltage is applied to the electro-erosion current circuit and thus to the erosion or work gap 4 which produces a work pulse between the electrode 107 and the workpiece 108. Only a single transistor TR8 has been depicted at the output stage 3 in order to preserve clarity in illustration. However, it will be understood that further transistors TR9 to TR12 are schematically illustrated by arrows and parallely connected with the junction point B, and their physical structure is the same as that of transistor TR8. Previously, the mode of operation of the electronic switches in the amplifier stage 2 for the time period $t_1$ to $t_2$ (FIG. 3) of the pulse has been described. It follows that when the PNP type transistor TR2 blocks or is non-conducting then the NPN type transistors in the output stage, namely transistors TR8 to TR12, are conductive.

There will now be briefly considered the mode of operation of the amplifier stage 2 for the time period $t_2$ to $t_3$ (FIG. 3) of the pulse applied to junction A. Since during this time $t_2$ to $t_3$ a negative bias or potential is applied to the base of the PNP type transistor TR2, the latter is conducting. The base of the NPN type transistor TR3 is negative via conductor 104 so that this transistor blocks. The NPN transistor TR4 is thus brought into the conducting state. The NPN type transistor TR5 is again blocked so that via the resistors 63 and 64 a negative potential is applied to the base of the NPN type transistor TR6 and PNP type transistor TR7, and which causes the NPN type transistor TR6 to be rendered non-conductive and the PNP type transistor TR7 to conduct. Accordingly, a negative bias or potential appears at the output side of the amplifier stage 2 via the resistor 66 and the collector-emitter circuit of the transistor TR7, and which blocks the transistors TR8 to TR12 in the output stage 3. Thus, for the time period $t_2$ to $t_3$ (FIG. 3), no work pulses appear across the operating or erosion gap 4. Summarizing, it can be stated that: whenever the transistor TR2 is conductive, then the transistors TR8 to TR12 are blocked or non-conductive.

The switching arrangement or device 5 receives via the conductors 109 and 110 the voltage conditions subsisting at the work gap 4 and delivers such to the control circuit of a switch 20. During the normal course of electro-erosion machining, as such has been described above, an average value of the voltage of for instance twenty-five volts appears between the workpiece 108 and the electrode 107. The capacitor 78 coupled in the control circuit of the relay 20 charges as soon as there appears a voltage across the conductors 109 and 110. This capacitor 78 on the one hand serves as a smoothing element for the subsequently coupled control circuit of the relay 20 and additionally serves as a storage element. Consequently, short circuits which appear for short periods of time at the erosion gap 4 will not have any effect upon the response sensitivity of the relay 20. The device or arrangement provided at the control circuit of the relay 20 and embodying the diodes 77, the resistors 70, 71, the transistor TR13 of the NPN variety, and the diode 72, serves for holding the current constant, so that the relay during small voltage fluctuations, which occur during normal electro-erosion machining and could very easily be mistaken for a short circuit, is not capable of being actuated. The voltage between the base and emitter of the transistor TR13 is constant because the voltage drop at the diode 77 likewise remains the same. Resistor 70 determines the current through the relay 20. The diode 72 is provided so that, upon response of the other switch 21, no spurious potential can reach the transistor TR13. During the normal course of the electro-erosion machining operation, as such has been described above, the relay 20 is pulled up or actuated, that is, the contacts 20a and 20b rest against the contacts 23 and 25 respectively.

At the moment where there exists a tendency towards short circuiting at the erosion or work gap 4 due to collecting of eroded material and cracking products, the voltage across the conductors 109 and 110 drops to zero volts. The current which flows through the relay 20 likewise drops because the voltage drop across the diodes 77 becomes smaller. Now, if the current falls below the holding current of the relay 20, this relay falls off or is de-actuated, so that the contact 20a is coupled with the contact 22. Consequently, the negative potential or bias of the conductor 104 is applied to the junction C of the amplifier stage 2 via the conductor 111, the contacts 20a, 22 and the conductor 112. Thus, the base of the PNP type transistor TR2 becomes negative so that this transistor conducts. The subsequent transistors TR3 to TR7 are changed over in corresponding manner, so that at the output side of the amplifier stage 2 there appears a negative blocking potential. This blocking potential arrives via the junction B of the output stage 3 at the NPN type transistors TR8 to TR12, so that these transistors are brought into blocking or non-conducive state. The circuit between the workpiece 108 and the conductor 102 is interrupted and current can no longer flow across the work gap. Therefore, the tendency towards short circuiting or the short circuiting itself is eliminated.

Now, in order to again place into operation or restart the electro-erosion machining operation after a certain time, the relay 21 is provided in the switching arrangement or device 5. Relay 21 is energized via the terminal 106, the conductor 110, the contacts 24, 20b, the resistor 74, the winding of the relay 21, and the conductor 102. However, this first happens after the capacitor 76 has been charged through the terminal 106, conductor 110, contacts 24, 20b, resistor 74, contacts 27, 21a and conductor 102. The charging time is dependent upon the time-constant of the RC-member 74, 76. Now, if after this time-constant the relay has responded, then the contacts 21a, 26 and 21b, 28 close. As a result, the relay 20 can respond via the contacts 21b, 28 and resistor 73. The diode 72 prevents current flow through the collector-base path of the transistor TR13. The capacitor 76 discharges to zero via the contacts 21a and 26 and the resistor 75. As a result, it is ensured that the relay 21 is again prepared to respond and, specifically, with the time-contant of the RC-member 74, 76 upon the appearance of a further short circuit at the work gap 4. After the relay 20 has responded, the relay 21 falls off or is de-engerized. Upon response of the relay 20, the negative potential of the conductor 104 at the junction C of the amplifier stage 2 via the conductor 111, the contacts 20a, 22, the conductor 112, is removed so that the transistor TR2 of the PNP variety is no longer blocked. Consequently, the normal electro-erosion operation again begins. After de-energization or falling-off of the relay 21, the relay 20 is again as usual fed via the conductor 110, the transistor TR13, the resistor 70. Now, if during the course of the machining operation there again appears at the work gap 4 the tendency towards short circuiting or, in fact, a short circuit itself, then the entire procedure begins again in the manner described above. Due to the alternate action of both relays 20 and 21, there is provided the advantage that, after the appearance of a short circuit or the tendency thereto, the electro-erosion machining operation is interrupted and after a short time, in accordance with the RC-constant of the members 74, 76 is again switched in. If the short circuit has still not been removed in the brief time between switching-in and out the amplifier stage 2, then the entire procedure repeats a number of times. In this case, it is also possible to employ an optical or acoustical alarm for the operator. Normally, however, upon the appearance of a short circuit, in other words, upon dropping of the voltage at the erosion gap 4, the feed device for the work electrode 107 is simultaneously influenced in the manner that the work gap is enlarged between the electrode 107 and the workpiece 108. The dielectric liquid, which is flushed with a certain flow velocity through the work gap, can float away the cause of the short circuit so that normally the monitoring or watchdog apparatus need not be brought into activity too often for one and the same short circuit incidence. It is here further mentioned that upon switching-in the amplifier stage 2, the feed device again displaces the work electrode 107 in the direction of the workpiece 108 so that the normal spacing between both of the latter is again ensured.

Of course, the relays 20 and 21 in the switching arrangement or device 5 could be replaced by other components, for instance tubes or transistors.

It is also to be recognized that the invention provides a monitoring or supervising apparatus which only responds to short circuits brought about by the heretofore-mentioned causes. The electric circuit does not respond to situations resembling short circuits and which often occur in practice during electro-erosion metalworking, for instance in that there is further provided a vibration device at the work electrode which permits the electrode to vibrate in a direction towards and away from the workpiece. In such case, it oftentimes happens that the electrode briefly comes too close to the workpiece. However, since this situation only takes place within a matter of milliseconds, the monitoring apparatus will not respond thereto.

By virtue of the above-described apparatus it is therefore possible to monitor or supervise the conditions subsisting at the operating or erosion gap and to ensure for trouble-free operation of the electro-erosion machining procedure.

While there is shown and described a present preferred embodiment of the invention it is to be distinctly understood that the invention is not limited thereto but may be otherwise variously embodied and practised within the scope of the following claims.

What is claimed is:

1. In combination, a monitoring apparatus for an electro-erosion machine having an erosion gap defined by a tool electrode and a workpiece, having an electrode feed device for removing the electrode from the workpiece upon the appearance of short circuits, and having a pulse generator for supplying pulses to the erosion gap, said monitoring apparatus comprising first switch means for suppressing the pulses, said first switch means being responsive after a predetermined time delay to a voltage drop due to the formation of an arc at the erosion gap, said first switch means delivering a blocking signal to the pulse generator, and second switch means for removing said blocking potential, said second switch means being actuated after a predetermined constant time delay subsequent to the response of said first switch means.

2. In combination, a monitoring apparatus for an electro-erosion machine having an erosion gap defined by a tool electrode and a workpiece and having a pulse generator for supplying work pulses to the erosion gap, said monitoring apparatus comprising first switch means responsive to a voltage drop due to the formation of an arc at the erosion gap for suppressing the work pulses, said first switch means delivering a blocking signal to the pulse generator, and second switch means actuated a predetermined time interval after the response of said first switch means for removing said blocking potential, and wherein both said first and second switch means includes a control circuit and work and rest contacts; said control circuit for said first switch means being coupled to the erosion gap and being operative to switch said first switch means from its work contact to its rest contact in response to said voltage drop at the erosion gap; said control circuit of said second switch means being coupled to said rest contact of said first switch means and comprising an RC time delay element, said control circuit for said second switch means being operative to switch said second switch means from its rest contact to its work contact a predetermined time interval after said first switch means is switched to its rest contact; and means coupling said work contact of said second switch means to said control circuit of said first switch means for switching said first switch means back to its work contact upon switching of said second switch means to its work contact, whereby said monitoring apparatus is reset.

3. The combination as defined in claim 2, wherein the pulse generator for supplying work pulses to the erosion gap comprises an amplifier means having a plurality of electronic switching stages, one of said switching stages having a control input coupled to said first switch means for receiving said blocking signal.

4. The combination as defined in claim 3, wherein said control circuit for said first switch means incorporates voltage divider means comprising diode means and a resistor, a transistor having a collector-emitter circuit, and a diode and a resistor coupled in the collector-emitter circuit of said transistor, so that in the event of voltage changes at said erosion gap a constant current of the same value flows through said first switch means.

5. The combination as defined in claim 4, said control circuit for said first switch means further including a capacitor connected in parallel with said diode means and serving as a smoothing element and a storage member, so that briefly occurring short circuits at the erosion gap have no effect upon said first switch means.

6. The combination as defined in claim 3, further including an output stage coupled with said erosion gap and the output side of said amplifier means, said blocking signal delivered to said control input of said given one of said electronic switching stages bringing said given one of said electronic switches of said amplifier means into the non-conductive state, the other of said electronic switches being subsequently coupled with said given one electronic switch, and wherein said subsequently coupled electronic switches of said amplifier means are acted upon such that a blocking potential appears at the output side of said amplifier means which blocks said output stage.

7. The combination as defined in claim 6, wherein said pulse generator further includes a pulse shaper stage coupled with an electronic switch of said amplifier means which is in circuit with said given one of said electronic switches which is sequentially arranged with respect thereto, said first-mentioned electronic switch bringing said sequentially arranged given electronic switch into the conductive or non-conductive state only in the absence of a blocking signal at said conducting means and in accordance with the control from said pulse shaper stage, so that owing to the mutual influencing of said other subsequently coupled electronic switches in said amplifier means an operating or blocking potential appears at the output side of said amplifier means.

8. The combination as defined in claim 7, wherein said output stage incorporates parallely connected electronic power switch means for controlling a current supply conductor leading to said workpiece in dependence upon the operating or blocking potential, and a capacitor provided in circuit with each of said electronic power switch means for ensuring rapid change-over from the non-conductive state into the conductive state.

9. The combination as defined in claim 8, wherein each of said electronic power switch means of said output stage includes a cathode-control grid circuit, and a protective diode and a resistor provided in each said cathode-control grid circuit.

10. The combination as defined in claim 7, further including a capacitor coupled in circuit with said given one of said electronic switches and said other subsequently coupled electronic switches for rapidly changing each of said aforementioned switches from the non-conductive state into the conductive state.

References Cited

UNITED STATES PATENTS 2,951,969   9/1960   Matulaitis et al.

FOREIGN PATENTS 759,190   10/1956   Great Britain.

RALPH F. STAUBLY, Primary Examiner